(12) United States Patent
Ni

(10) Patent No.: US 7,046,231 B1
(45) Date of Patent: May 16, 2006

(54) OPTICAL MOUSE WITH STATIONARY SENSORS

(76) Inventor: Eric Ni, 5986 Pilgrim Ave., San Jose, CA (US) 95129

( * ) Notice: Subject to any disclaimer, the term of this patent is extended or adjusted under 35 U.S.C. 154(b) by 328 days.

(21) Appl. No.: 10/405,862

(22) Filed: Apr. 1, 2003

(51) Int. Cl.
*G09G 5/08* (2006.01)

(52) U.S. Cl. ........................ 345/157; 345/345; 345/158; 345/175

(58) Field of Classification Search ........ 345/157–158, 345/162–163, 165, 168–169, 175
See application file for complete search history.

(56) References Cited

U.S. PATENT DOCUMENTS

| | | | | |
|---|---|---|---|---|
| 4,254,333 A | * | 3/1981 | Bergstrom | .................. 250/221 |
| 5,801,681 A | * | 9/1998 | Sayag | ........................ 345/157 |
| 6,166,370 A | * | 12/2000 | Sayag | ........................ 250/221 |
| 6,255,643 B1 | * | 7/2001 | Sayag | ........................ 250/221 |
| 6,320,177 B1 | * | 11/2001 | Sayag | ..................... 250/208.1 |
| 6,707,027 B1 | * | 3/2004 | Liess et al. | .................. 250/221 |
| 2004/0046741 A1 | * | 3/2004 | Low et al. | ................... 345/166 |

* cited by examiner

*Primary Examiner*—Sumati Lefkowitz
*Assistant Examiner*—Rodney Amadiz
(74) *Attorney, Agent, or Firm*—Robert Samuel Smith

(57) ABSTRACT

A computer system featuring a wireless method for securing the system against unauthorized use and controlling cursor movement including a computer with a built in mouse area. The mouse area has a window of transparent medium and an LED and camera with photosensor array housed within the camera. The camera records images of surfaces of an object pressed against the outer surface of the transparent medium. In another embodiment the, object is a SMART card with circuitry communicating wirelessly with circuitry inside the computer.

4 Claims, 3 Drawing Sheets

OPTICAL MOUSE WITH STATIONARY SENSORS

FIELD OF THE INVENTION

This invention relates to cursor pointing devices for a computer and particularly to a cursor controller for a personal digital assistant.

BACKGROUND OF THE INVENTION

A computer mouse is a handheld device that a user slides over a suitable surface causing the cursor on a computer screen to move in a direction determined by the motion of the device.

Most all such devices have five components: a ball, two rollers, two encoding disks, a pair of infrared LEDs and infrared sensors, and a microprocessor.

The ball inside the mouse touches most any selected surface and rolls as the device is moved on the surface. The two rollers inside the mouse touch the ball. Each roller rolls in response to a component of motion of the mouse that is orthogonal to the component of motion that drives the other roller. One roller is coupled to one encoding disk and the other roller is coupled to the other encoding disk. Each disk has a circumferential row of apertures. A pair of infrared sensors on one side of each disk detects light from one of a pair of infrared LED on the opposite side of the respective disk and thereby detects rotational displacement of the disk (roller) corresponding to translation of the mouse over the surface in contact with the ball. The processor chip detects the pulses from the sensors and sends the data (by a connecting cord) to the computer.

For each disk, the direction of rotation of the disk is determined by comparing the phases of the optical signals from the respective disk.

The first "optical" disk included a source of a focused beam reflected off a pad onto a sensor. A grid pattern of dark lines was disposed onto the highly reflective surface of the pad. Motion of the pad was detected by interruption of the focused beam by the grid lines.

A limitation of this mouse was the requirement to maintain a specified angle of reflection.

More recently, a so-called "optical" mouse has been disclosed as in U.S. Pat. No. 4,631,400 to Tanner et al and U.S. Pat. No. 6,513,717 to Hannigan.

This optical mouse has a small red light emitting diode (LED) that is reflected off (almost any) surface onto a complimentary metal semiconductor (CMOS sensor, the CMOS sensor sends each signal to a digital signal processor (DSP) for analysis. The DSP operating at 18 mega Instructions per Second is able to detect changes in patterns in the images. The DSP determines how far the mouse has moved by the changing sequences of images, and sends corresponding signals to the computer for control of the cursor. The image signals are received hundreds of times per sec.

The optical mouse, as presently disclosed and marketed has advantages compared to the Opto-mechanical mouse principally in terms of increase tracking resolution and elimination of a requirement for a special tracking surface.

The "form" of these cursor controllers (mice) of the current art are not compatible with the trend of a large segment of the computer market toward the introduction of more "personalized" devices adapted for use where "portability" is an important requirement.

By "form" is meant the physical characteristics of a device such as size, design, shape, weight and power requirements. The "form" therefore, determines the convenience with which the user can operate the device under restricted circumstances. The devices include laptop computers, notebooks, PDAs (personal digital assistants). In the context of this specification, PDA is defined to mean any small handheld device that provides computing, and/or information storage and retrieval capabilities. Since the object in the design of these devices is to provide a device that can be slipped into a pocketbook or shirt pocket, the necessity of using the state of the art optical or opto-mechanical mouse defeats the purpose of the device. The attachment of such devices by cable to the state of the art "mouse" is incompatible with the intended scope of use of the handheld device.

Another problem that is closely associated with the proliferation of PDAs is the protection from theft of the information stored in these devices and the identification of the user. Theft by bank fraud involving false deposits, check forgery has become an enormous problem. The typical response of law enforcement agencies is that a fingerprint is the only certain way to prevent these crimes.

Another problem is that custodians of computers have control over which programs stored in a computer are available for use to only a segment of the public.

For example, a librarian may want to "lease time" that a user uses a particular program on the Internet, computer.

Some photocopying outlets offer desktop publishing facilities.

There are other situations wherein a "public computer" is available for use by the public wherein the computer has stored programs that perform a variety of functions such as web searching, email services, CAD, word processing.

Another problem is that custodians of computers wish to have control over which programs stored in a computer are available for use to only a segment of the public. For example, certain programs may be deemed inappropriate for minors.

SUMMARY OF THE INVENTION

It is an object of this invention to provide a system for controlling a cursor on a screen that overcomes a number of disadvantages of the "mouse" of the prior art.

In particular, it is an object to eliminate the requirement for a cable connecting the mouse to the computer for carrying power to the mouse and carrying the displacement signal from the mouse to the computer.

Another object is to eliminate the problem of physical separation of the mouse from the computer with the possibility that the mouse can be misplaced, lost or stolen. This problem is exacerbated by the practice of carrying the PDA or laptop computers on the person of the user.

Yet another object is to prevent damage to the mouse that may result in the case of the state of the art mouse where the mouse is separated from the computer. Such damage can result from dropping the mouse or accidentally ripping the power cord from the mouse.

Another object is to eliminate the expense inherent in requiring an extra housing for the mouse.

Still another object is enhancing the security of the information stored in the PDA and particularly the identification of the user.

This invention is directed toward a cursor pointing system incorporated completely into the PDA arranged to control the position of a cursor on the screen of the computer. To operate, the user simply places the surface of an object (e.g., a card) against a "mouse area" which is a part of the surface of the computer. In one version, correspondence of a feature (such as a design or alphanumeric indicia with an image stored in the PDA) operates as a key to enable the user to operate the computer. Movement of the object in contact with the "mouse" area enables the user to move the cursor on the screen of the computer to desired locations.

The "mouse region" just below the "mouse area" contains a red light emitting diode (LED) and an array of photosensitive elements. The photosensitive elements are preferably CMOS photosensors although other photosensors may be used such as charge coupled diodes (CCDs).

In one embodiment, the sensor array and LED are mounted in a "mouse region" of the computer on one side of a refracting transparent medium. The "outside" surface of the transparent medium is a flat reference surface against which the user presses his finger or medium (such as a card) to form a slideable interface. The "inside" surface of the transparent medium is contoured to focus a light beam from the LED. The light beam is reflected from the slideable interface back to the sensor.

The sensors of the sensor array develop a charge pattern that represents the image of the reference surface.

A photo signal is thereby developed in the sensor array that represents the image of the interface. The image is compared to an authorized image in order that the user may proceed with the operation of the computer.

In another embodiment, the surface of a small card is pressed into contact with the mouse surface. The card has a unique design on its surface that may be so faint as to be imperceptible to the user but which can be "read" by the sensor array.

An image of the interface is thus recorded as signals from the sensor which are transmitted to a data signal processor and the operating system in the computer. The operating system analyzes the signals by comparing successive images which it interprets as movement of the object surface. A cursor on the computer screen moves in a direction for a distance responsive to the movement of the image interface.

In another embodiment of the invention, the card has an embedded transceiver construction including an antenna, rectifier, processor and memory. The computer also has a transceiver construction including an antenna, processor, memory and a power supply.

The computer antenna radiates a power signal and a "wakeup" signal to the card antenna. The card rectifier rectifies the power signal to drive the card circuitry. The card processor sends a program or program address from the card memory through the card antenna to the computer transceiver circuit. The computer transceiver circuit downloads the program or retrieves the program from its memory corresponding to the signal from the card transceiver for use by the computer operator (cardholder).

DESCRIPTION OF PREFERRED EMBODIMENT

Figure 1:
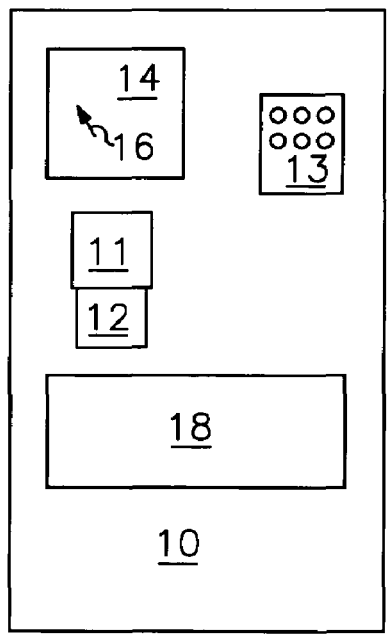
FIG. 1 is a block diagram of the system.

Turning now to a discussion of the drawings, FIG. 1 is a block diagram showing a computer (PDA) 10 with processor 11, memory 12, a keyboard 13, and monitor screen 14 with a cursor 16.

Software programs including an operating system and application program are installed in the memory.

Figure 2:
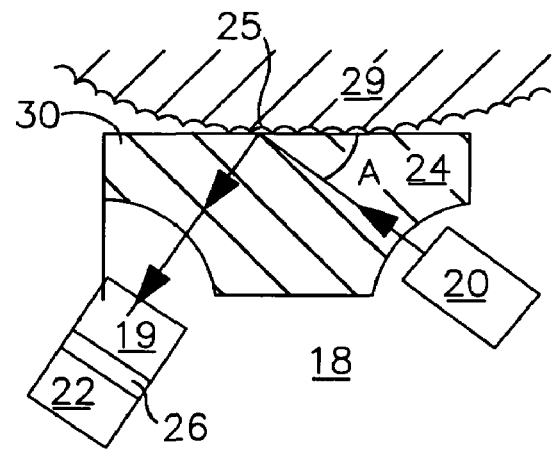
FIG. 2 shows the arrangement of the mouse region.

FIG. 2 shows in cutaway cross section the details of the mouse region 18 to better advantage. There are shown a transparent medium 24 having one side facing a CMOS camera 26 with array 22 and LED 20. The other side of the transparent medium 24 contacts the surface of an object 29 forming an interface 25.

In one version of the invention, the object 29 is a card that has printed thereon a "password" image (e.g., alpha numeric). The password image is transmitted by the camera 26 to the central processor 11 for storage in memory 12. The system will operate only when the image is identical to an "authorized" image stored in system memory 12.

The CMOS camera 26 includes a lens 19 and two dimensional CMOS array 22. The CMOS camera used in this implementation is a Xirlink IBM PC camera distributed by the IBM Corporation, which includes a lens and an Agilent CMOS image sensor.

The sensor signal is transmitted to a digital signal processor 11. The digital signal processor is activated when the object surface contacts the outer surface of the transparent medium to form interface 25. The processor operates in two modes, i.e., the "recognition" mode and the run mode.

Figure 3:
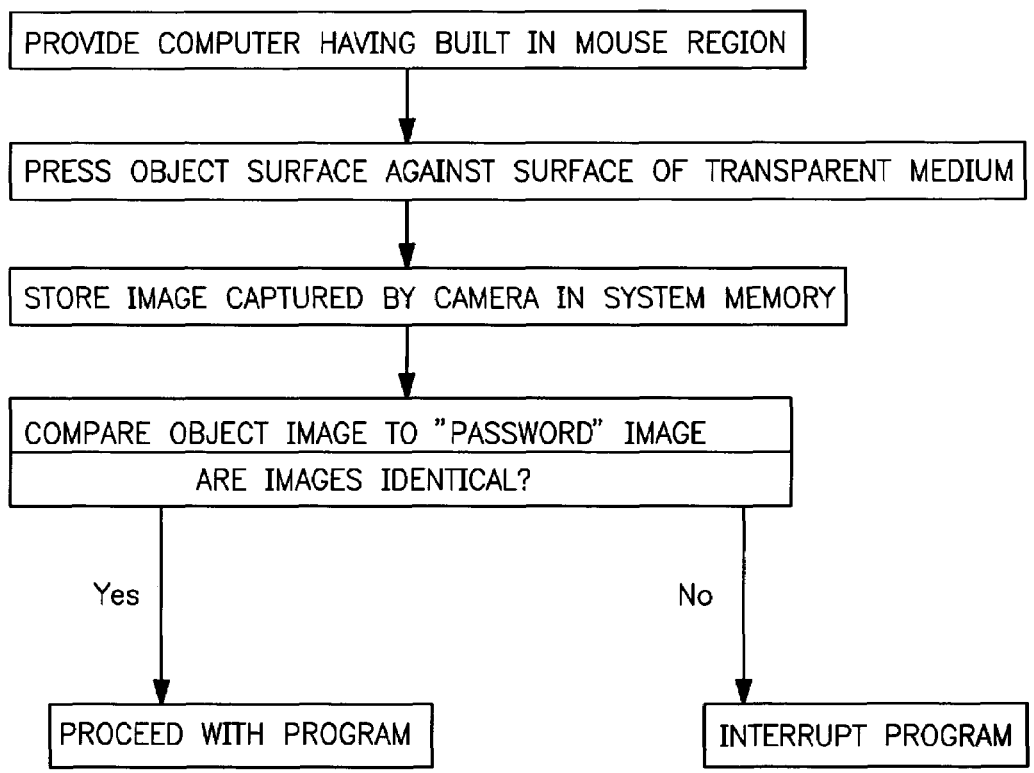
FIG. 3 is a flow chart showing operation in the security mode.

FIG. 3 illustrates the steps of the recognition mode.

In step 1, an apparatus is provided being a computer having the built-in mouse region described in this specification.

In step 2, the user presses the object surface against the (flat) outer surface of the transparent medium forming the interface 25.

In step 3, an image of the interface 25 is registered by the camera 26 and transmitted to the system memory 12.

In step 4, a software program stored in system memory 12 compares the newly recorded image data to the "password" data stored in system memory.

In step 5, if the image data is identical to the password data, then the system is conditioned to accept additional image data according to the second mode.

In the cursor tracking mode, the cursor control system moves the cursor on the monitor screen during a succession of cycles. Each succession of cycles is a period during which the cursor is moved in incremental distances from an initial location to a final location.

The computer has a first memory, a second memory; and a memory for storing an application program arranged to control the cursor on the monitor screen;

The camera 26, enclosed in the computer, has a field of view and comprises an array of photosensors 22. The array 22 has integer 3n columns and integer 3n rows of photosensors;

The LED 20, enclosed in the computer, is arranged to illuminate the interface and form an image of the interface 25 on the array 22 of photosensors;

Each photosensor has a location defined by a row coordinate x, and a column coordinate y.

The first and second memories 12 each have an array of addresses. Each address, i,j corresponds to location x y, in the photosensor array.

i and j are integers between 1 and 3n in the first memory for storing image signals of a current cycle.

i and j are integers between 1 and n in the second memory for storing image signals of a central cluster of image signals which represent a central region of the interface image determined during a most recent previous cycle.

The application program is programmed to store current image signals, $\Sigma P'_{ij}$, at respective $9n^2$ $^{addresses}$ i,j in the first memory during a current cycle replacing data stored during the previous cycle.

The application program is programmed to form a plurality of correlation values, $N_{rs}$, wherein $$N_{rs} = \Sigma^n_{i=1} \Sigma^n_{j=1} (P_{ij} - P'_{i+r,j+s})^2$$

for addresses, r,s wherein r,s are integers and are selected in an order according to a selection process;

The plurality of correlation numbers is formed until integers r',s' are determined where $$N_{r's'} = 0$$

r',s' represent a new location of the central cluster during the current cycle;

After the new location r's' has been determined, the application program is programmed to transfer each image signal, $$P_{i+r',j+s'}$$

from respective addresses i+r',j+s' in the first memory to addresses i,j in the second memory.

The process for selecting r,s to compute $N_{r,s}$ is:
(i) beginning with r=0, and, for each r,
(ii) incrementing by 1 each value of s between −r and r; then
(iii) decrementing by 1 each value of r between r and −r for s=r; then
(iv) decrementing by 1 each value of s between r and −r; then
(v) incrementing by 1 each value of r between −r and r.

The application program is programmed to then move the cursor on the screen from one screen location M,N, corresponding to memory address i, j to another screen location M'N" corresponding to memory address i+r,j+s.

Figure 4:
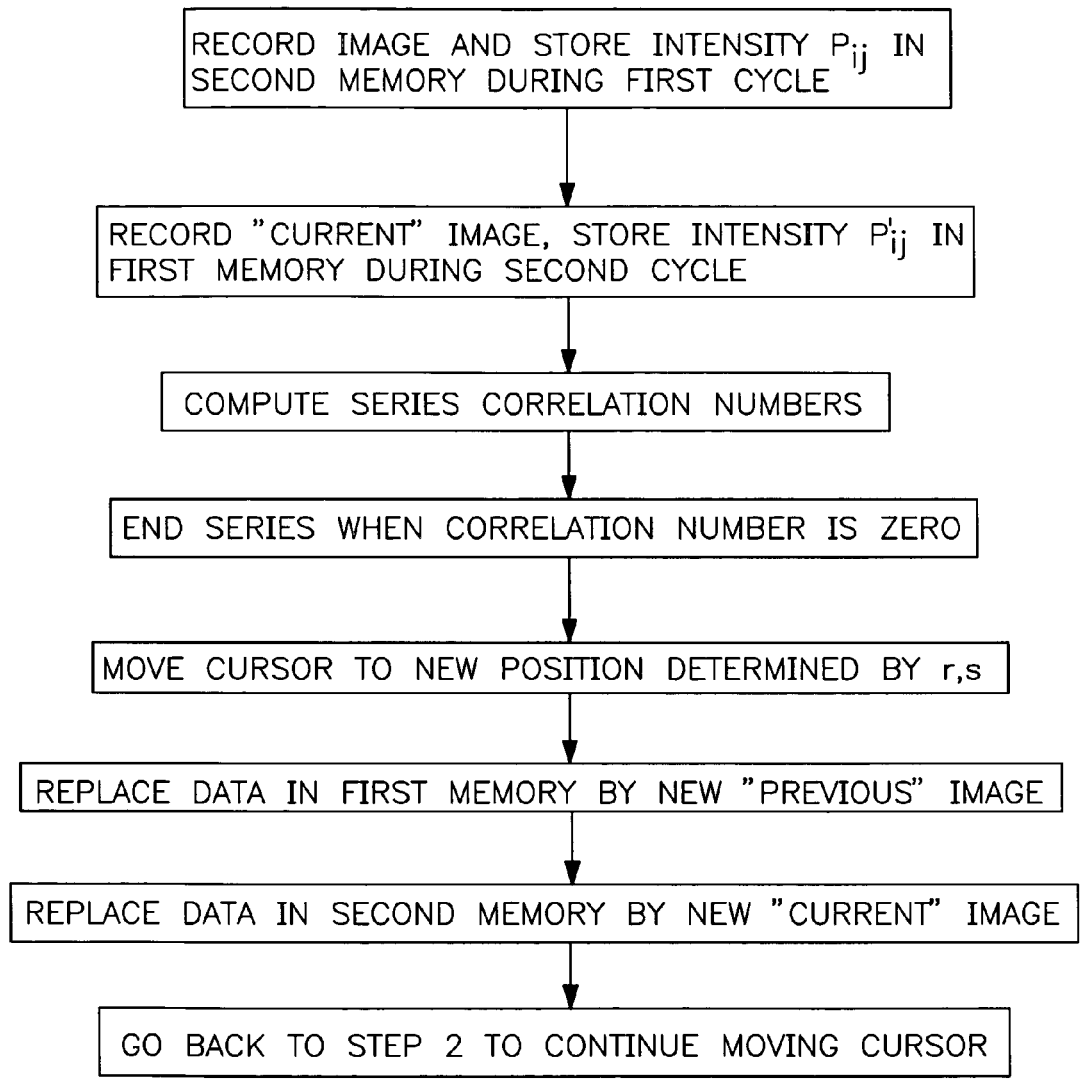
FIG. 4 is a flow chart showing steps in the cursor control mode.

FIG. 4 is a flow chart of the steps during a cycle of the second mode.

In step 1, an initial image of a central region of an interface is recorded and intensity values $P_{ij}$ are stored in a second memory having $n^2$ addresses.

In step 2, a "current" image of the object surface is recorded and intensity values $P'_{ij}$ are stored in a first memory having $9n^2$ addresses.

In step 3, a series of correlation values is computed where each correlation value, is given by:

$$N_{rs} = \Sigma_{i=1}^n \Sigma_{j=1}^n (P_{i,j} - P'_{i+r,j+s})^2$$

Until a set of coordinates r',s' are determined where $N_{r's'} = 0$.

The coordinates r',s' is the change of location of the addresses of image signal that takes place between the current cycle and the next previous cycle.

In step 4, a cursor is moved from an initial location by a displacement determined by r,s.

In step 5, Replace data in first memory by the new "previous" centered at r',s'.

In step 6, repeat steps 2 to 5 until the last cycle.

There has been described a computer system that enables a user to control the position of a cursor on a monitor screen by moving a object in contact with the surface of a transparent medium.

Modifications and variations may be contemplated after reading the specification which are within the scope of the invention.

Figure 5:
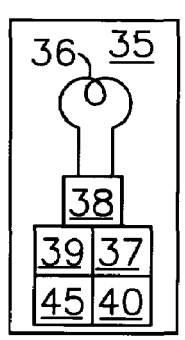
FIG. 5 shows a SMART card used as an object to provide access to selected programs.
Figure 5:
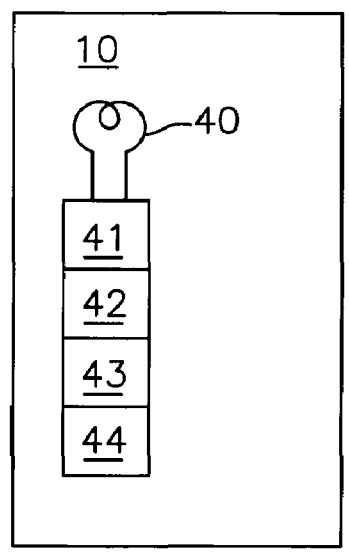

For example, FIG. 5 shows an embodiment in which the object forming the interface with the transparent medium) is a "smart" card 35. A "Smart" card is known in the art to be circuit on a card including an antenna 36 and transmitter 38 powered by a small battery in the card or by power transmitted wirelessly from the computer 10 to the card 35.

Information on the Smart card is read by an antenna 40 in a transceiver 41 in the computer 10 communicating with the antenna 36 in the Smart card.

The CARD CIRCUIT 35 has a built in antenna 36, a rectifier 37, memory 39 and processor 45. The card circuit communicates with a computer circuit (in the computer 10) including a computer antenna 40, connected to transmitter 41, central processor 42, computer memory 43, computer power 44, so as to direct the computer to selected applications depending on addresses and messages in the card memory 40.

One application includes selection of data or a file intended solely for the holder of the card.

The use of a card with a unique design enables the user to loan the card to coworkers when it is required that more than one individual operate the computer system.

The photosensors may be any one of CMOS devices or CCDs (charge coupled diodes).

The cursor control system described above satisfies the objectives of cursor control and security. The combination of photosensing circuit in the computer and electromagnetic signal transmitting circuit on a card "read by a photsensing circuit has been described as presenting numerous heretofore unanticipated applications of the computer system.

Variations and modifications may be suggested by reading the specification and studying the drawings, which are within the scope of the invention.

For example, in one embodiment, the optical mouse is incorporated into the keyboard for additional operational convenience.

It is understood that the scope of this invention is directed toward an optical mouse arranged as an integral part of a computer. Movement of a card held proximal to the LED of the mouse is measured by matching successive images recorded by the camera. A squares method of this invention is applied to calculate the movement of the image.

I therefore wish to define the scope of the invention by the appended claims.

What is claimed is:

1. A cursor control system for moving a cursor on a screen during a succession of cycles, said succession of cycles being a period during which said cursor is moved in incremental distances from an initial location to a final location, said system comprising:
   a computer having
      (a) monitor;
      (b) a first memory;
      (c) a second memory;
      (d) a memory for storing an application program arranged to control a cursor on said monitor screen;
   a transparent medium forming a part of a surface of said computer;
   said transparent medium having an outside surface accessible for contact to a surface of an object to form an interface between said transparent medium and said object;
   a camera enclosed, in said computer, having a field of view and comprising an array of photosensors wherein said array has integer 3n columns and integer 3n rows of photosensors;
   an LED enclosed in said computer;

said LED arranged to illuminate said interface and form an image of said interface on said array of photosensors;

each photosensor has a location defined by a row coordinate x, and a column coordinate y;

said first and second memories each having an array of addresses wherein each address, i,j corresponds to location x y, in said photosensor array;

i and j are integers between 1 and 3n in said first memory for storing image signals of a current cycle;

i and j are integers between 1 and n in said second memory for storing image signals of a central cluster of image signals which represent a central region of said interface image determined during a most recent previous cycle;

said application program programmed to store current image signals, $\Sigma P'_{ij}$, at respective $9n^2$ addresses i,j in the first memory during a current cycle replacing data stored during the previous cycle;

said application program programmed to form a plurality of correlation values, $N_{rs}$, wherein $$N_{rs} = \Sigma^n_{i=1} \Sigma^n_{j=1} (P_{ij} - P'_{i+r,j+s})^2$$

for addresses, r,s wherein r,s are integers and r,s are selected in an order according to a selection process;

said plurality of correlation numbers formed until integers r',s' are determined where $N_{r's'} = 0$ wherein r',s' represent a new location of said central cluster during the current cycle;

said application program programmed to transfer the image signals $$\Sigma^n_{j=1} \Sigma^n_{i=n} P_{i+r',j+s'}$$

from respective addresses i+r',j+s' in said first memory to addresses i,j in said second memory;

said process for selecting r,s being:
  (i) beginning with r=0, and, for each r,
  (ii) incrementing by 1 each value of s between −r and r; then
  (iii) decrementing by 1 each value of r between r and −r for s=r; then
  (iv) decrementing by 1 each value of s between r and −r; then
  (v) incrementing by 1 each value of r between −r and r.

2. The system of claim 1 wherein said application program is arranged to compare an image signal from said object to an authorized signal stored in memory and permit operation of said system only when said signal is identical to said authorized signal.

3. The system of claim 1 further comprising: a card being said object, having a first antenna and a card circuit including a processor, rectifier, memory and memory address stored in said memory; said computer including a second antenna arranged to communicate with said first antenna on said card and arranged to radiate electromagnetic power to said first antenna enabling said rectifier to generate dc power to energize said card circuit whereby said memory address is communicated to said computer.

4. The system of claim 3 wherein said memory address is an address of a file stored in said computer and said application program is programmed to run said file.

* * * * *